(12) United States Patent
Yoon

(10) Patent No.: US 7,808,730 B2
(45) Date of Patent: Oct. 5, 2010

(54) LENS ASSEMBLY WITH ACTUATING MEANS AND AUTO-FOCUS CONTROLLING APPARATUS HAVING THE SAME

(75) Inventor: Young-Koin Yoon, Seoul (KR)

(73) Assignee: Diostech Co., Ltd., Kyunggi-Do (KR)

( * ) Notice: Subject to any disclaimer, the term of this patent is extended or adjusted under 35 U.S.C. 154(b) by 496 days.

(21) Appl. No.: 11/801,073

(22) Filed: May 7, 2007

(65) Prior Publication Data

US 2008/0037143 A1   Feb. 14, 2008

(30) Foreign Application Priority Data

Aug. 8, 2006   (KR) ................ 10-2006-0074622

(51) Int. Cl.
*G02B 7/02* (2006.01)

(52) U.S. Cl. .................. 359/826; 359/819; 359/824

(58) Field of Classification Search .......... 359/808, 359/811, 813, 819, 821, 822, 823, 824
See application file for complete search history.

(56) References Cited

U.S. PATENT DOCUMENTS

| 5,499,143 | A  | * | 3/1996 | Sakamoto et al. ........... 359/824 |
| 7,103,303 | B2 | * | 9/2006 | Suzuki et al. ............... 399/175 |
| 7,221,524 | B2 | * | 5/2007 | Ye et al. ..................... 359/819 |

* cited by examiner

*Primary Examiner*—Ricky L Mack
*Assistant Examiner*—Brandi N Thomas
(74) *Attorney, Agent, or Firm*—Duane Morris LLP; Lewis F. Gould, Jr.; Frank J. Spanitz

(57) ABSTRACT

A lens assembly has a driving actuator which includes a magnet, a yoke and a coil and is formed along a lens barrel that accommodates a lens unit for focusing and an auto-focus controlling apparatus comprises the lens assembly for camera module. The magnet or the coil has an internal diameter smaller than a maximal diameter of the lens barrel. Therefore, it is possible to manufacture much smaller lens assembly according to the present invention compared to the conventional ones and to reduce the possibility of component damages in the lens assembly in operating the camera module.

30 Claims, 11 Drawing Sheets

LENS ASSEMBLY WITH ACTUATING MEANS AND AUTO-FOCUS CONTROLLING APPARATUS HAVING THE SAME

BACKGROUND OF THE INVENTION

This application claims the benefit of Korean Patent Application No. 2006-74622, filed on Aug. 8, 2006, in Korea, which is hereby incorporated by reference for all purposes as if fully set forth herein.

FIELD OF THE INVENTION

The present invention relates to a lens assembly and an auto-focus controlling apparatus including the lens assembly and more particularly, to a lens assembly for auto-focusing with a driving means and an auto-focus controlling apparatus accommodating the lens assembly mounted in a camera module which can be applied to a mobile communication device.

DISCUSSION OF THE RELATED ART

A camera means a device for taking pictures or capturing images through a plurality of lenses by adjusting relative distances among the lenses and thereby focusing the lenses of the camera. A conventional widely-used auto-focus controlling apparatus for a camera has adopted a mechanical operation by a gear which turns a rotational movement of a motor into a straight-line movement so as to move the lenses. However, such mechanical operation causes inevitably static-dynamic errors resulted from a friction between the motor and the gear, mechanical deformation, backlash, and the likes. Therefore, it is very difficult or impossible to control or adjust finely focusing and to make a small camera owing to the space occupied by the motor and the gear in such an apparatus.

Especially, a camera module for taking pictures of still images has been mounted to a mobile communication device such as a cellular phone, a personal digital assistant (PDA), and the likes. Recently, a camera module with an auto-focus controlling apparatus which uses voice-coil mechanism has been developed in order to overcome the mechanical auto-focus controlling apparatus and thereby satisfying the requirements such as a miniaturization, a light weight and a multi-function in the mobile communication devices. The auto-focus controlling apparatus operated by the voice-coil uses Lorentzs force, which is generated by induced magnetic force of coil under the static magnetic force resulted from a permanent magnet, for linear movement. FIG. 1 is a cross-sectional view of a conventional auto-focus controlling apparatus which has been applied to the mobile communication device.

As shown in FIG. 1, the conventional auto-focus controlling apparatus 1 applied to the mobile communication device comprises a lens barrel or a lens holder 12 with a hollow top center. The lens barrel 12 accommodates a lens unit 10 which includes plural lenses commonly through threaded couplings. A magnet 20, a yoke 22 and a coil 24 are arranged adjacently to or along the outside of the lens barrel 12. Besides, leaf springs 32 and 34 are formed respectively on the top of the lens barrel 12 and the beneath the lens barrel 12. The leaf springs 32 and 34 interconnect the lens barrel 12, which moves repeatedly up and down, with the magnet 20-yoke 22-coil 24 fixed to the lens barrel 12 so that they function as supplying currents with both ends of the coil 24. The lens barrel 12 and a driving actuator including the magnet 20, the yoke 22, and the coil 24 for operating the lens barrel 12 are accommodated in a housing 40 through threaded couplings. A cover plate 14 is formed in the upper inside of the housing 40. Besides, the auto-focus controlling apparatus 1 of the camera module applied to the mobile communication device has a high-resolution image sensor (not shown), such as a charge coupled device (CCD) or a complementary metal-oxide semiconductor (CMOS), which is arranged under the lens barrel 12.

For obtaining preferentially a definite image of an object in the optical system of the camera module which has been more smaller gradually, it requires the camera module to have a finely-adjusted focusing function which images definitely the object on the image sensor by adjusting or controlling the distances between the lenses and the image sensor, or changing the curvature of the lenses. For such a focusing, the lens unit 10 commonly includes one and more, preferably plural lenses. Therefore, it is possible to focus the object by moving up and down the plural lenses and thereby adjusting the distance the lenses and the image sensor. Accordingly, at least one lens can move up and down around an optical axis so as to provide the focusing function.

In case of operating the focusing function, the position of the image captured on the image sensor is depending on the position of the object. In other words, the position of the image captured on the image sensor is changed dependently according to the distance between the lens and the object. Accordingly, at least one lens should be moved relatively so as to obtain the definite image on the image sensor. Separate driving source, for example a manual, a step motor, a voice coil motor (VCM), and the likes, is required for achieving the focusing function in such a lens assembly. Especially, the lens assembly adopting the VCM mechanism has been widely used in the mobile communication device recently. In the auto-focus controlling apparatus which uses the VCM mechanism, the magnet 20 generating the magnetic force and the coil 24 supplying currents are arranged in the opposite position each other. Therefore, the lens barrel 12 is operated by Lorentz force, which is generated perpendicularly to the direction of the current and the magnetic force, and thereby moving the lenses within the lens barrel 12 up and down.

It has required much smaller lens assembly of the camera module that meets the conditions of the ultra-miniaturization and the high-definition of the lens, which corresponds to the high-definition image sensor such as CCD and CMOS in the camera module applied in the mobile communication device. In case of manufacturing the camera module for satisfying the requirements such a miniaturization, a light-weigh, and a low-cost, the lens unit for achieving the focusing and/or zooming function is operated unstably and the components constituting the lens assembly may be damage easily because the lens unit is connected to the lens barrel through a single pin.

For overcoming such disadvantages, Korean Patent No. 550907 a device for positioning a lens of a camera module comprising a driver with a ring-like piezoelectric actuator which generates a mechanical driving force and a rotational plate which rotates around an optical axis by the driving force of the piezoelectric force. Beside Korean Patent No. 490253 discloses an auto-focus adjustment apparatus which includes two connectors for supplying current with both ends of the coil. Each of two connectors disclosed in the Korean Patent No. 490253 have a semi-circular shape, i.e. a half part of a circular leaf spring. Two terminals protruded respectively from each end of two connectors are extended outwardly to an electronic circuit board through a soldering, respectively. Also, Korean Patent No. 514533 suggests a camera apparatus which includes a lens guide for supporting a lens holder and a suspension means for fixing the lens guide.

However, the driving source such as a magnet, a coil and a yoke for operating the lens unit is arranged along the outside of the lens barrel in the conventional auto-focus controlling apparatus of the camera module applied to the mobile communication device. Accordingly, the conventional auto-focus controlling apparatus must have at least dimension which add the diameter of the lens barrel to the width of the driving source, which prevents the auto-focus controlling apparatus with much smaller size from being manufactured and causes the auto-focus controlling apparatus to have limitation in the efficiency of the power consumption. Moreover, since each component in the driving source is arranged along the lens barrel without fixing firmly to it, it is very difficult to connect such arranged driving source to the lens barrel accommodating the lens unit in manufacturing the auto-focus controlling apparatus.

SUMMARY OF THE INVENTION

Accordingly, the present invention is directed to a lens assembly and au auto-focus controlling apparatus having the lens assembly that substantially obviate one or more of problems due to limitations and disadvantages of the related art.

It is an object of the present invention to provide a lens assembly which makes a focusing stably and finely and a driving only less currents compared to the conventional ones by arranging a driving actuator closely along an outside of the lens barrel and thereby reducing the whole dimension or size of the lens barrel, and an auto-focus controlling apparatus including the lens assembly. Such a closely configuration prevents the lens assembly from damaging owing to outside shocks and makes the lens barrel operated with less currents compared to the conventional ones. Electrical power is supplied with the driving coil through brushes each of which is formed respectively on and beneath a housing of the auto-focus controlling apparatus of the present invention. Therefore, it is possible to apply voltage or currents to the driving actuator much stably compared to through a semi-circular leaf spring in the conventional one.

It is another object of the present invention to provide a lens assembly having a driving means as a unit and an auto-focus controlling apparatus having the lens assembly. The camera module can be manufactured conveniently through such configuration. Besides, the components in the driving source are hardly damaged in the course of operating the apparatus. Especially, since the lens assembly comprises an elastic means which is arranged along the intermediate outside of the lens barrel accommodating the lens unit and is moved dependently on the lens barrel, the arrangement of the driving actuator limits the movement of the elastic means and thereby preventing the elastic means damaging during the reciprocating motion upwardly and downwardly of the lens assembly in case operating the auto-focus controlling apparatus. Besides, the auto-focus controlling apparatus can be manufactured by interconnecting the housing to the lens assembly through threaded couplings in producing the camera module. Therefore, it is possible to increase the convenience and productivity in manufacturing the camera module.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, the present invention provides a lens assembly comprises a lens barrel accommodating one or more lenses for focusing: a driving actuator arranged along the outside of the lens barrel for operating the lens assembly, the driving actuator comprising a magnet generating magnetic force, and a coil connected to a power supply; and an elastic means formed adjacently to the driving actuator, wherein at least one of the magnet and the coil has an internal diameter smaller than a maximal external diameter of the lens barrel.

The lens barrel according to the present invention comprises a plural diametric portion each of which has different diameters respectively, wherein the magnet or the coil is disposed along any one of the plural diametric portions which has not maximal diameter. According to one embodiment of the present invention, the lens barrel comprises a first diametric portion and a second diametric portion which has larger diameter than that of the first diametric portion. In this case, the magnet or the coil may be arranged adjacently to or along the first diametric portion. Preferably, the lens barrel comprises a first diametric portion, a second diametric portion which has a larger diameter than that of the first diametric portion, and a third diametric portion which has a larger diameter than that of the second diametric portion. In this embodiment, the magnet is arranged along the first diametric portion and the coil is wound around the second diametric portion.

In addition, the lens assembly may further comprise a yoke for inducing the magnetic force into a predetermined direction. The yoke of the driving actuator may comprise a first yoke mounted laterally adjacently to an outside of the magnet and the coil and a second yoke formed over the first yoke and the magnet. Especially, the lens assembly further comprises a lower cover formed adjacently to a lower portion of the outside of the lens barrel, preferably formed under the yoke. Particularly, the elastic means comprises a first elastic means inserted between the yoke and the lower cover and a second elastic means joined to the lens barrel and the lower cover. The elastic means may comprise a spring such as a leaf spring.

In another aspect, the present invention provides an auto-focus controlling apparatus comprises the lens assembly as mentioned above and a housing which accommodates the lens assembly. The lens assembly is connected to the housing through threads such as screw threads. Especially, the housing may further comprise a brush which is contacted with the lens assembly. Preferably, the brush comprises a first brush formed on the top periphery of the housing and a second brush formed in the lower portion of the housing. The first brush is connected to the coil thorough the yoke. The second brush is connected to the coil through the elastic means, i.e. the second elastic means. Particularly, the first brush comprises one terminal or one end extended downwardly along the outside of the housing and the other terminal extended downwardly along the inside of the housing, and the second brush comprises one end protruded upwardly in the housing and the other end extended laterally through a hollow bottom center of the housing. The auto-focus controlling apparatus may further comprise a filter such as a UV filter bonded to a bottom of the housing.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings:

FIGS. 10A and 10B are cross-sectional views taken along the line X-X' of FIG. 9, wherein FIG. 10A shows arrangements of components of the auto-focus controlling apparatus prior to focusing and FIG. 10B shows arrangements of components of the auto-focus controlling apparatus after focusing.

DETAILED DESCRIPTION OF THE ILLUSTRATED EMBODIMENTS

Reference will now be made in detail to the illustrated embodiment of the present invention, which is illustrated in the accompanying drawings.

Figure 1:
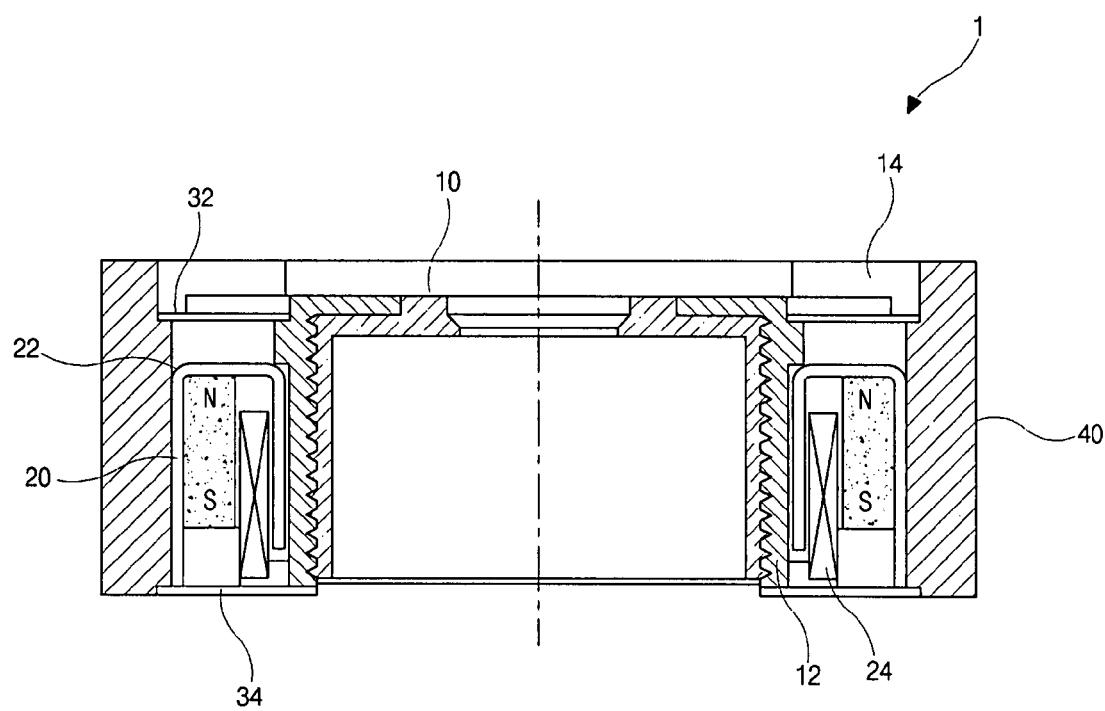
FIG. 1 is a cross-sectional view of a conventional auto-focus controlling apparatus of camera module which is applied to a mobile communication device.
Figure 2:
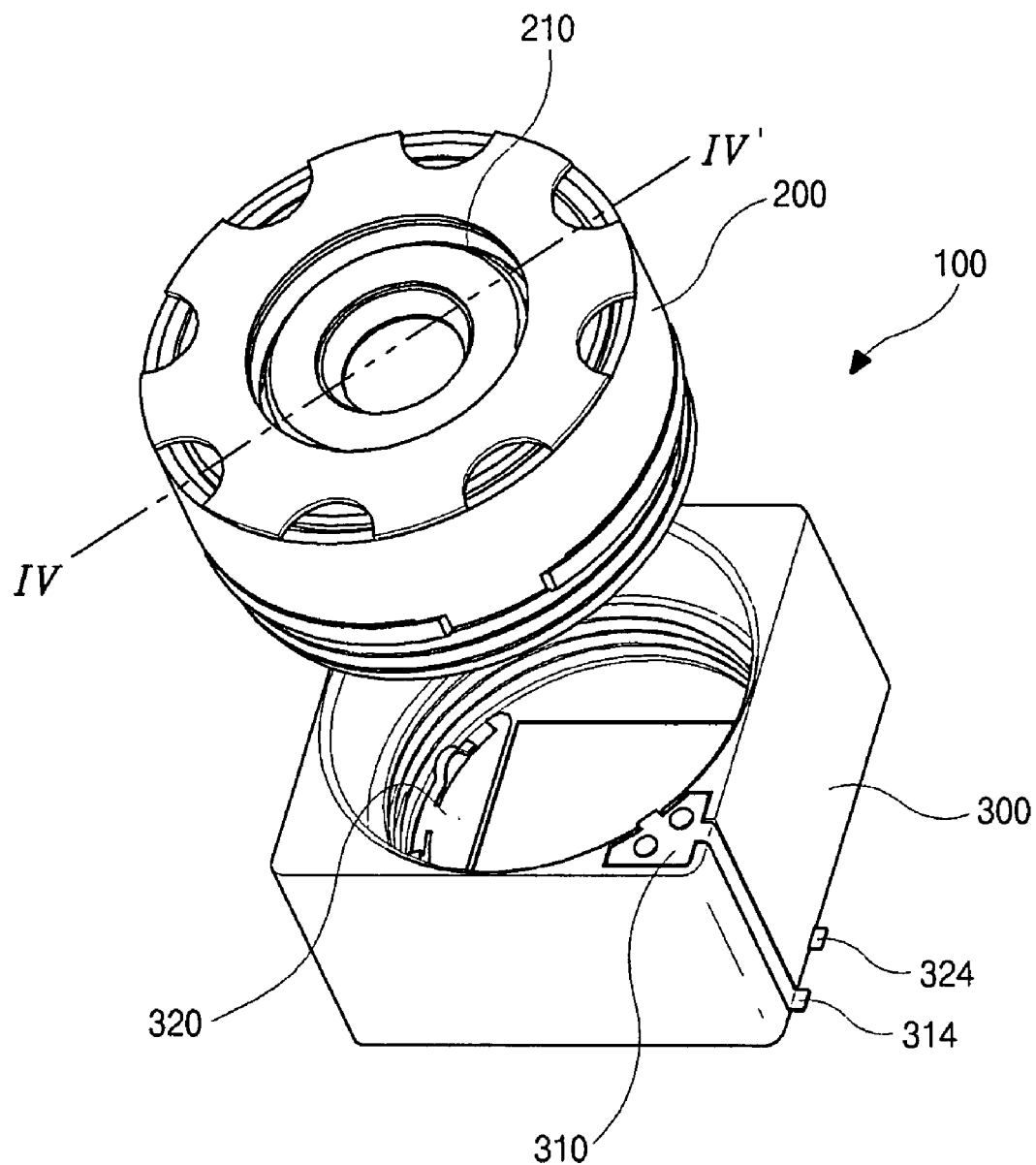
FIG. 2 is an exploded perspective view of an auto-focus controlling apparatus according to the present invention.

FIG. 2 is an exploded perspective view of an auto-focus controlling apparatus which comprises a lens assembly for focusing and a housing accommodating the lens assembly according to the present invention. As shown in FIG. 2, an auto-focus controlling apparatus 100 of the present invention comprises a lens assembly 200 which includes a lens barrel 210 with a hollow top center for accommodating the a lens unit and a housing accommodating the lens barrel for auto-focusing. The lens unit includes one or more lenses each of which preferably has a different diameter, respectively. According to one embodiment of the present invention, the lens assembly 200 has screw threads, which corresponds to screw threads formed in the lower inside of the housing 300, in the lower outside thereof so that the lens assembly 200 can be accommodated within the housing through the threads coupling.

Especially, the first brush 310 is mounted on the top edge of the housing 300 and the second brush 320 is arranged along a part of the lower inside of the housing 300. Preferably, each one end of the brushes 310 and 320 is connected to electrically to a power supply (not shown) so as to provide electrical power with a driving source of the lens assembly 200 and to drive the lens assembly 200. According to one embodiment of the present invention, one terminal 312 (in FIG. 7) of the first brush 310 formed upon the housing 300 is extended downwardly along the inside of the housing 300 to an intermediate position of the housing 300 so as to contact with the driving source of the lens assembly 200, and the other terminal 314 of the first brush 310 is extended downwardly along the outside of the housing 300 to the bottom of the housing 300 and then bent outwardly so that it can be connected to the power supply. Therefore, for example, (−) voltage can be applied to the driving source of the lens assembly 200 through the first brush 310. Besides, one end 322 (in FIG. 7) of the second brush 320 formed on the lower periphery, that is along a part of the lower inside, of the housing 300 is contacted with a second elastic means 262 (in FIG. 5), which is joined to the bottom of the leans assembly 200, and the other end 324 of the second brush 320 is extended outwardly along the bottom of the housing 300 so that it can be connected to the power supply. Therefore, for example, (+) voltage can be applied to the driving source through the second brush 320.

Figure 3:
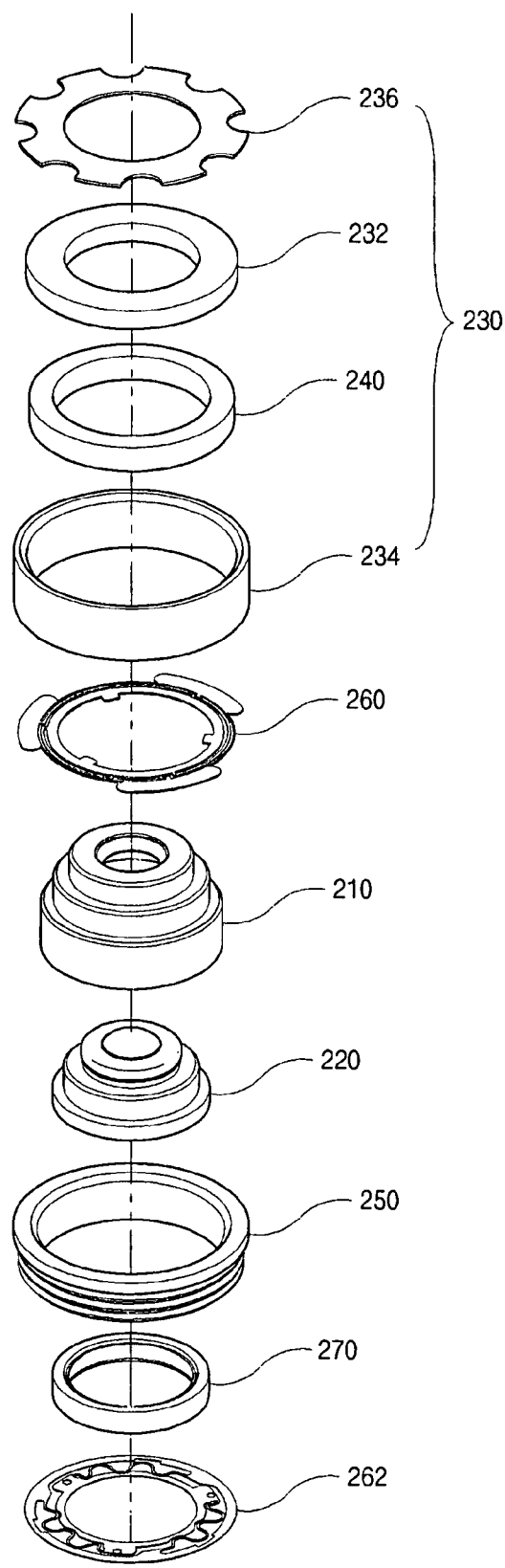
FIG. 3 is an exploded perspective view of a lens assembly according to the present invention.
Figure 4:
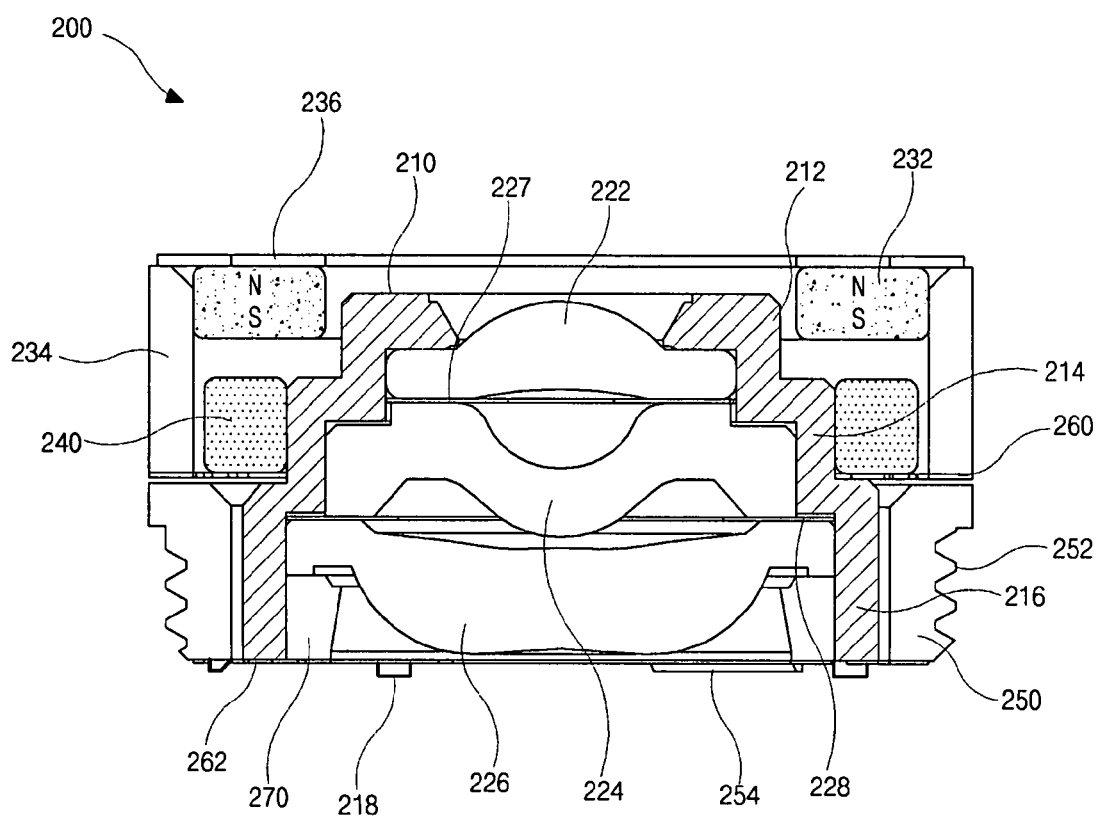
FIG. 4 is a cross-sectional view of a lens assembly taken along the line IV-IV' of FIG. 2.

The lens assembly 200 for focusing with a driving source such as a driving actuator in the auto-focus controlling apparatus 100 according to the present invention will be explained in more detail. FIG. 3 is an exploded perspective view of the lens assembly 200 according to the first embodiment of the present invention, and FIG. 4 is a cross-sectional view of the lens assembly 200 taken along the line IV-IV' of FIG. 2. As shown the Figures, the lens assembly 200 according to the first embodiment of the present invention comprises a lens barrel 210 with hollow top center for accommodating a lens unit 220 which has one or more lenses, preferably plural lenses with different diameter, respectively. A driving actuator 230, which includes a magnet 232, yokes 234 and 236 and a coil 240, as a driving means or a driving source is arranged along the outside of the lens barrel 210. Preferably, a lower cover 250 with threads 252 is formed under the first yoke 234, a first elastic means 260 is interposed tightly between the yoke 234 and the lower cover 250 and a second elastic means 262 is fixed beneath the lens barrel 210 and the lower cover 250 so that the elastic means 260 and 262 can apply the voltages into the driving coil 240, respectively.

As mentioned above, the lens unit 220 which has at least one lens for focusing is accommodated in the lens barrel 210 according to the present invention. Although the lens unit 220 has three lenses 222, 224 and 226 with different diameters or external diameters respectively in the figures as only illustrative, it is apparent for those having ordinary skill in the art that the lens unit 220 has more or less lenses for focusing. The plural lenses 232, 234 and 236 in the lens unit 230 are accommodated and assembled into the lens barrel 210 so that each of them accords with an optical axis.

As described above, the convention lens barrel accommodating a lens unit has generally a cylindrical form, that is, both the top and the bottom of the conventional lens barrel or lens holder for focusing have the same diameters. On the contrary, the lens barrel 210 according to this embodiment is not simple cylinder, but has at least two portions with different diameters. As shown in FIG. 4, the lens barrel 210 according to this embodiment comprises a first diametric portion 212 with a minimal diameter in the upper region, a second diametric portion 214 with an intermediate diameter that is larger than that of the first diametric portion 212 in the middle region, and a third diametric portion 216 with a maximal diameter that is larger than that of the second diametric portion 214 in the lower region. Accordingly, a first lens 222 with a minimal diameter among the plural lenses accommodated in the lens unit 220 is arranged along the inside of the first diametric portion 212, a second lens 224 with an intermediate diameter that is larger than that of the first lens 222 is arranged along the inside of the second diametric portion 214, and a third lens 226 with a maximal diameter that is larger than that of the second lens 224 is arranged along the inside of the third diametric portion 216. The lens barrel 210 with different diametric portions can be made of metal or plastic, for example by pressing plastics through an extrusion molding, a compression molding, an injection molding, and the likes.

Besides, the lens assembly 200 comprises a first lib 227 which is connected to the inside of the first diametric portion 212 and interposed between the lower edgy of the first lens 222 and the top edgy of the second lens 224, a second lib 228 which is connected to the inside between the second diametric portion 214 and the third diametric portion 216 or to the upper inside of the third diametric portion 216 and interposed between the lower edgy of the second lens 224 and the top edgy of the third lens 226, and a supporting portion 270 which is interposed between the lower inside of the third diametric portion 216 and the lower edgy of the third lens 226 so that each of the lenses 222, 224 and 226 can be assembled and arranged stably within the lens barrel 210. Further, a diaphragm (not shown) is formed on the upper inside of the lens barrel 210 so that it can cover the top edgy of the first lens 222 and can separate a light-transmission region from a light-non-transmission region.

Especially, the driving actuator 230 for driving the lens barrel 210 up and down is arranged laterally adjacently to or along the outside of the lens barrel 210, especially adjacently to or along the outside of the first diametric portion 212 and the second diametric portion 214. The driving actuator comprises a magnet 232, yokes 234 and 236 and a driving coil 240 each of which has a different predetermined diameter and a hollow center, respectively.

According to this embodiment, the magnet 232 is arranged with its inside adjacently to the outside of the first diametric portion 212 which accommodates and assembles the first lens 222 therein and its outside adjacently to the inside of the first yoke 232 which constitutes the upper perimeter of the lens assembly 200 according to this embodiment. The magnet 232 according to this embodiment may comprise a permanent magnet which is used in VCM. Preferably, the magnet 232 is arranged with its top as a north pole and its bottom as a south pole as shown in FIG. 4, and vice versa. Preferably, an internal diameter of the magnet 232 is smaller than the external diameter of the second diametric portion 214, which is formed interim of the lens barrel 210, and/or the external diameter of the third diametric portion 216. The magnet 232 must have the internal diameter which is smaller than the external diameter of the third diametric portion 216. In other words, although the magnet 232 may have an external diameter larger than those of the second diametric portion 214 and the second diametric portion 216, it has the internal diameter smaller than the external diameter of the third diametric portion 216. Therefore, it is possible to reduce dimension of the auto-focus controlling apparatus significantly in the present invention compared to the conventional auto-focus controlling apparatus which must have minimal dimension of the diameter of the lens assembly plus the width between the inside and the outside of the magnet. The magnet 232 has preferably an O-ring shape, i.e. a kind of disc with a predetermined hollow center.

The yokes 234 and 236 made of a ferromagnetic substance are arranged or formed on and along the magnet 232. Both the yokes 234 and 236 induce a magnet force generated from the magnet 234 into a predetermined direction, for example only a transverse axial direction of the lens assembly 200. Preferably, the first yoke 234 is arranged along the outside of the magnet 232 and the second yoke 236 is formed on the magnet 232 for achieving such object and thereby controlling effectively a magnetic flux resulted from each pole of the magnet 232. In other words, the first yoke 234 is arranged with its inside adjacently to the outside of the magnet 232 and the second yoke 236, which has an internal diameter substantially the same as that of the magnet 232, is arranged with its bottom placed onto the magnet 232 according to this embodiment. Each of the yokes 234 and 236 has preferably an O-ring shape, i.e. a kind of disc with predetermined hollow center, respectively.

Especially, the driving coil 240 which is connected electrically to the power supply (not shown) for driving the lens barrel 210 is arranged under the magnet 232. Preferably, the coil 240 is wounded with its inside adjacently to the outside of the second diametric portion 214 of the lens barrel 210. Therefore, the coil 240 has an internal diameter smaller than the external diameter of the third diametric portion 216. The driving coil 240 has preferably an O-ring shape, i.e. a kind of disc form. The driving coil 240 which receives voltages from the power supply has preferably a wire diameter of about 0.03~0.07 mm, an resistance of about 20~24 ohms, and may wounded about 110~150 turns.

The lens barrel 210 and the lens unit 220, which is accommodated and assembled into the lens barrel 210, can move linearly along the optical axis through induced magnetic forces generated from the interactions between the magnet 232 and the driving coil 240 which constitute the driving actuator 230. When predetermined currents are applied into the driving coil 240 which is wounded adjacently to the outside of the lens barrel 210, the induced magnetic forces resulted from the interactions between the currents and the magnetic forces from the magnet 232, which is arranged opposite to the driving coil 240, acts as Lorentz force and thereby causing the lens barrel 210 to move linearly along the optical axis. Accordingly, the driving coil 240 plays an important role in changing the flux of the magnetic forces generated from the magnet 232. Although the driving coil 240 is arranged under the magnet 232 in FIG. 4 as illustrative, the driving coil 240 may be arranged along the upper outside of the lens barrel 210 and the magnet 232 may be arranged under the driving coil 240. In other words, the driving coil 240 is arranged adjacently to the outside of the first diametric portion 212 and the magnet 232 is arranged adjacently to the outside of the second diametric portion 214.

The first yoke 234, which is formed along the upper perimeter of the lens assembly 200, is extended vertically or downwardly from the lower periphery of the second yoke 236, which may act as a top-plate, to a lower portion of the second diametric portion 214 of the barrel 210. Beneath the first yoke 234 a lower cover 250 is arranged with its inside adjacently to the outside of the third diametric portion 216 which constitutes a lower portion of the lens barrel 210. The lower cover 250 has plural threads 250 along the outside thereof. The threads 252 are corresponding to threads 302 (in FIG. 7) formed along a lower inside of the housing 300 so that the lens assembly 200 can be joined to the housing 300 through threads couplings.

Particularly, a first elastic means 260 is interposed between the lower portion of the first yoke 232 and the top of the lower cover 250, and a second elastic means 262 is connected the bottoms of the lens barrel 210 and the lower cover 250 according to this embodiment as shown in FIG. 4. The elastic means 260 and 262 contact with the lens barrel 210 which accommodates plural lenses and thereby pressurizing elastically the lens barrel 210. Any kind of elastic means that has an appropriate elastic coefficient for returning the lens barrel 210 to the original position after the lens barrel is moved linearly owing to the operation of the driving actuator as mentioned above can be uses an the elastic means 260 and 262. Preferably, the elastic means 260 and 262 comprise a spring such as a leaf spring used commonly in the relevant art.

The first elastic means 260, which is interposed between the bottom of the first yoke 234 and the top of the lower cover, is connected electrically to the first brush 310 formed on the top periphery of the housing 300 and thereby applying voltages, for example (−) voltages into the driving coil 240. For achieving such an object, the first elastic means 260 is arranged with its inside or internal diameter in contact with the outside of the second diametric portion 214 and with its internal region placed onto the third diametric portion 216. The driving coil 240 is in contact with the internal region of the first elastic means 260.

In such an arrangement, a conducting wire (not shown) can be connected to the contact region between the first elastic means 260 and the driving coil 240 and a slot (not shown) can be formed along the outside of the second diametric portion 214 for compensating the protrusion of the contact region. On the contrary, the outside of the first elastic means 210 is contacted pressurizably to the first yoke 232 made of conducting material. Therefore, when the (−) voltages are applied to the first brush 310, the first elastic means 260 is set as ground through the first yoke 234 which is connected electrically the first brush 310 so that the (−) voltages may be applied into the driving coil 240 which is in contact with the first elastic means 260. As the (−) voltages are applied to the driving coil 240 and thereby causing the lens barrel 210 to move linearly, the outside of the first elastic means 260 is fixed firmly owing to it is contact pressurizably with the first yoke 234 while the inside of the first elastic means 260 may change its position corresponding to the movement of the lens barrel 210 by its own elasticity.

The second elastic means 262 is bound to the bottoms of the lens barrel 210 and the lower cover 250. One end of the second elastic means 262 is connected electrically to the second brush 320 which is formed along the lower inside of the housing 300 and the other end of the second elastic means 262 is connected electrically to the driving coil 240 through a line (not shown). Therefore, the (+) voltages provided through the second brush 320 can be applied to the driving coil 240 through the second elastic means 262. The line (not shown) from the driving coil 240 is extended downwardly to the second elastic means 262 through a groove (not shown) formed along the outside of the lens barrel 210 for electrical connection between the second elastic means 262 and the driving coil 240. A contact region between the line and the second elastic means 262 may be soldered or brazed.

Figure 5:
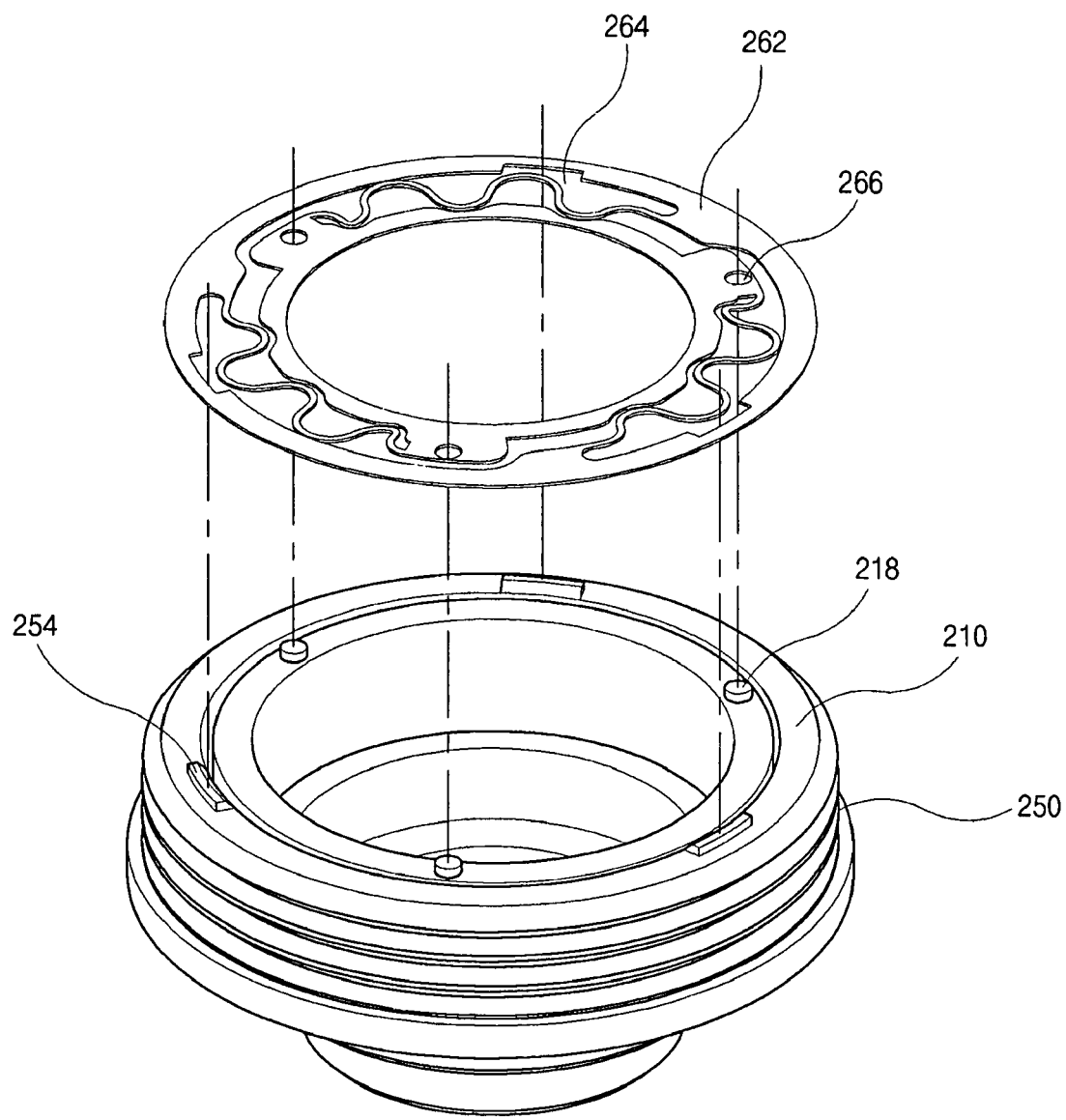
FIG. 5 is an exploded lower perspective view which shows a second elastic means joined to a lens barrel and a lower cover in the lens assembly.

The second elastic means 262 may be joined to the lens barrel 210 and the lower cover 250 by connecting means which is formed under them according to this embodiment. FIG. 5 is an exploded lower perspective view which shows the second elastic means 262 joined to the lens barrel 210 and the lower cover 250 in the lens assembly. As shown in FIG. 5, the lower cover 250 is joined to the second elastic means 262 through a fixing end 254 which is extended downwardly from the lower periphery of the lower cover 250 and inserted within a fixing slot 264 which is formed along a portion of the periphery of the second elastic means 262. Preferably, each of the lower cover 250 and the second elastic means includes a plural fixing ends 254 and a plural fixing slots 264, respectively. Also, the lens barrel 210 is connected to the second elastic means 262 through a connection protrusion 218 which is formed beneath the lens barrel 210 and passed through a connection hole 266 of the second elastic means 262. Preferably, each of the lens assembly 210 and the second elastic means includes a plurality of connection protrusions 218 and a plurality of connection holes 266, respectively. Therefore, each of a periphery region and a center region of the second elastic means 262 can be joined or fixed to the lower cover 250 and the lens barrel 210, respectively. On the contrary, an inside region of the second elastic means 262 is not fixed through a specific connecting means. Therefore, the inside region can change its position corresponding to the movements of the lens barrel 210 while the outside region of the second elastic means 260 cannot change its position because it is fixed firmly to the lens barrel 210 or the lower cover 250, as currents are applied into the driving coil 240.

The first elastic means 260 is arranged with its outside region being pressurized between the first yoke 234 and the lower cover 250 in accordance with this embodiment, while the leaf spring in the conventional auto-focus controlling apparatus is arranged onto the lens barrel. As shown in FIG. 4, the magnet 232 is spaced apart from the driving coil 240 before currents are applied. However, when the lens barrel 210 moves upwardly as currents are applied into the driving coil 240, the driving coil 240, which is formed along the outside of the second diametric portion 214 and onto the top of the third diametric portion 216, also moves upwardly so that the driving coil 240 contacts with the magnet 232. Since the lens barrel 210 cannot move upwardly any more owing to the contact between the magnet 232 and the driving coil 240, the inside region of the first elastic means 260, which is arranged onto the third diametric portion 216 and moves correspondingly to the movements of the lens barrel 210, also cannot bent upwardly beyond the distance between the magnet 232 and the driving coil 240. Besides, in case the lens barrel 210 moves downwardly, the inside region of the first elastic means 260 can only moves downwardly predetermined distance owing to the lower cover 250 which is arranged beneath the first elastic means 260. In other words, it is possible to prevent the inside region of the first elastic means 260 from bending downwardly beyond the distance as much as a height difference between an inside region and an outside region of the lower cover 250. Therefore, it is possible to prevent the first elastic means 260 from being destroyed owing to an over-stress in the course of adjusting focus. Besides, since a user have only to connect the lens assembly 200 assembled as mentioned above to the housing 300 via threads in manufacturing the auto-focus controlling apparatus 100, the user can get some advantages in manufacturing and using it.

As mentioned above, the plural lenses 222, 224 and 226 each of which has a specific curvature and a specific diameter are assembled into the corresponding diametric portions 212, 214 and 216 each of which has a specific diameter, respectively. Also, the driving actuator 230 such as the magnet 232 and the driving coil 240 is arranged adjacently to or along the outside of the diametric potions 212 and 214 which do not have a maximal diameter, and the yoke 234 and the lower cover is arranged in the periphery of the lens assembly 200 so that they are in contact with the inside of the housing 300. Therefore, it is possible to decrease the total dimension or size of the lens assembly 200 and the auto-focus controlling apparatus 100 in the present invention compared to the conventional ones. In other words, each of the magnet 232 and the driving coil 240 is arranged adjacently to the outsides of first diametric portion 212 and the second diametric portion 214, respectively, with its internal diameter smaller than the external diameter of the third diametric portion 216 which has a maximal diameter among the diametric portions. Accordingly, the lens assembly 200 has only a dimension of adding the external diameter of the lens barrel 210 to the space between the inside and the outside of the yoke 234. Therefore, it is possible to reduce the whole size and the weight of the auto-focus controlling apparatus 100.

In addition to the advantages, as the driving actuator 230 is arranged closely to the outside of the lens barrel 210, the lens assembly 100 which comprises the lens barrel 210 and the lens unit 220 functions as auto-focusing in itself.

Figure 6:
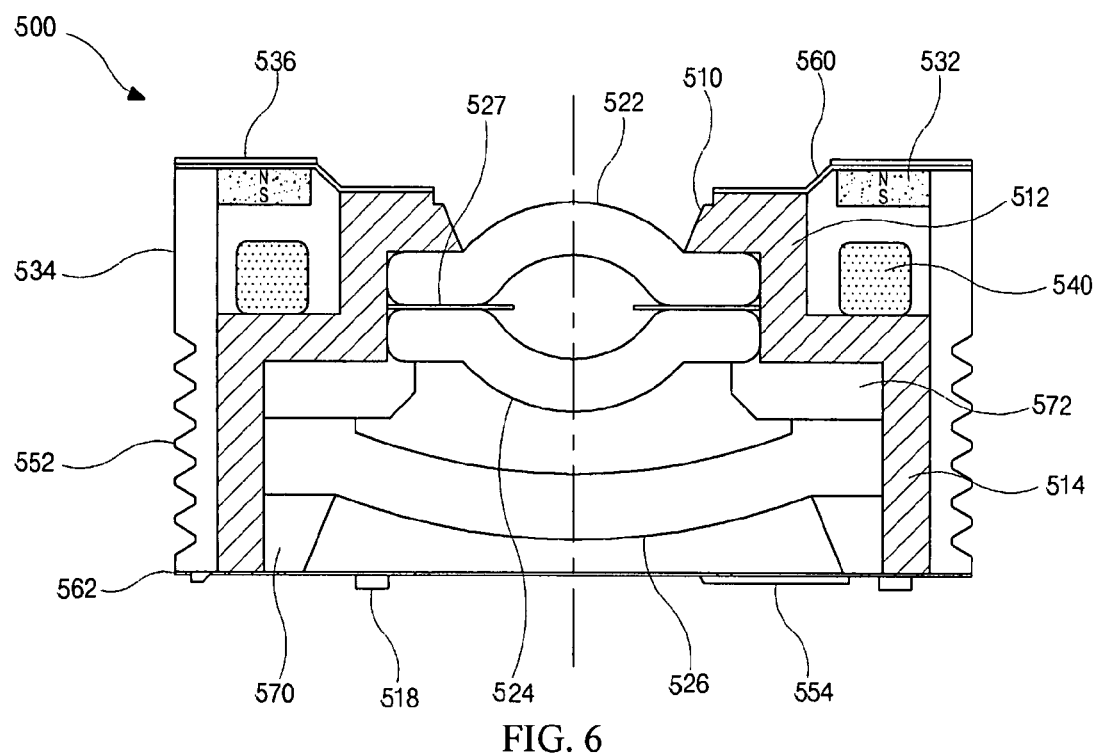
FIG. 6 is a cross-sectional view of a lens assembly according to another embodiment of the present invention.

Besides, it is possible to assemble the lens assembly 200 which comprises other components with other arrangement. FIG. 6 is a cross-sectional view of a lens assembly according to another embodiment of the present invention. It will omit the detailed explanation about the components that is described above with reference to FIG. 3 to 5. As shown in FIG. 6, a lens assembly 500 includes a lens barrel 510 which accommodates one or more focus lenses 522, 524 and 526 and has different diameters in the upper region and the lower region. The lens barrel 510 according to this embodiment comprises a first diametric portion 512 in the upper region and a second diametric portion 514 in the lower region. Corresponding to such characteristic shape of the lens barrel 510, a third lens 516 among plural lenses has larger internal and external diameters than those of the first lens 522 and the second lens 524. The first lens 522 has substantially the same curvature and diameter as the second lens 524, although they may have different a curvature and/or a thickness. A diaphragm (not shown) may be formed on the upper inside of the lens barrel 510 so that it can cover the top edgy of the first lens 522 and can separate a light-transmission region from a light-non-transmission region.

It will be explained about the arrangements and assemblies of the lenses in more detail. As shown in FIG. 6, the first lens 522 and the second lens 524 is accommodated or assembled into the inside of the first diametric portion 512 formed in the upper region of the lens barrel 510, while the third lens 526 is accommodated or assembled into the inside of the second diametric portion 514 formed in the lower region of the lens barrel 510. A supporting portion 570 is formed between the lower inside of the second diametric portion 514 and the lower periphery of the third lens 526, and a spacer 572 is inserted between the top periphery of the third lens 526 and the upper inside of the second diametric portion 514 so that the third lens 526 may be connected to the lens barrel 510. Besides, a first lib 527 is extended from the inside of the first diametric portion and is inserted between the bottom periphery of the first lens 522 and the top periphery of the second lens 524 for supporting the first lens 522. The lens barrel 510 in this embodiment can be made of metal or plastic, for example by pressing plastics through an extrusion molding, a compression molding, an injection molding, and the likes.

A driving actuator is also arranged closely and adjacently to the outside of the lens barrel 510 according to this embodiment. As shown in FIG. 6, a magnet 532 is arranged adjacently to the upper outside of the first diametric portion 512 and the driving coil 540 is wounded adjacently to the lower outside of the first diametric potion 512 with its bottom in contact with the top of the second diametric portion 514. Because at least one of the magnet 532 and the driving coil 540 has an internal diameter smaller than an external diameter of the second diametric portion 514 in this embodiment, it is possible to decrease the whole dimension of the lens assembly 500. Also, the driving coil 540 is arranged adjacently to the upper outside of the first diametric portion 512 and the magnet 532 is arranged adjacently to the lower outside of the first diametric portion 512. In other words, the magnet 532 may be arranged under the driving coil 540.

Also, a first yoke 534 is formed vertically along or adjacently to outsides of the magnet 532 and the driving coil 540 so that it constitutes a perimeter of the lens assembly 500. As shown in FIG. 6, the first yoke 534 is extended from the top to the bottom of the lens assembly 500. Threads 552 are formed in the lower outside of the first yoke 534 for connecting the lens assembly 500 to a housing which accommodates the lens assembly 500.

Especially, a first elastic means 560 is placed onto the lens barrel 510, the magnet 532 and the first yoke 534, and a second elastic means 562 is connected beneath the lens barrel 510 and the first yoke 534 in accordance with this embodiment. The elastic means 560 and 562 may comprise a spring such as a leaf spring. The second elastic means 562 can be connected to the lens barrel 510 and the first yoke 534 as shown in FIG. 5. In addition, a stopper (not shown) is formed under the second diametric portion 514 of the lens barrel 510 and the first yoke 534 for preventing the second elastic means 562 from being over-bent downwardly and thereby being damaged as the lens barrel 510 moves downwardly.

The first elastic means 560 is connected electrically to the first brush 310 (in FIG. 7) through the first yoke 534 and to one end of the driving coil 540, and the second elastic means 562 is electrically connected to the second brush 320 (in FIG. 7) and to the other end of the driving coil 540, so that a specific voltage can by applied into the driving coil 540. As mentioned above, a groove or a slot (not shown) may be formed along the outside of the lens barrel 510 and a conductive wire of the driving coil 540 may be connected to each of the elastic means 560 and 562 for electrical connection between each of the elastic means 560 and 562 and the driving coil 540.

A conventional leaf spring may be used as the first elastic means 560 that is arranged onto the lens barrel 510 and the magnet 532. In this case, the leaf spring controls the magnetic force generated from the magnet 540 as a yoke. Preferably, a second yoke 534 is placed onto the first elastic means 560 as shown in FIG. 6. The second yoke 534 has substantially the same internal diameter as that of the magnet 532 and substantially the same external diameter as that of the first yoke 534 for controlling the magnetic force effectively. The second yoke 536 has preferably an O-ring shape, i.e. a kind of disc with a predetermined hollow center.

As described above, the driving actuator such as the magnet 532 and the driving coil 540 is arranged along the outside of the first diametric portion 512 which has smaller diameter compared to the second diametric portion 514, the driving actuator forms the internal diameter smaller than the external diameter of the second diametric portion 514. On the contrary, since the conventional auto-focus controlling apparatus includes a cylindrical lens barrel which accommodates plural lenses with the same diameter and a driving actuator arranged along the outside of the lens barrel, it must have minimal size of dimension adding the external diameter of the lens barrel to the width between the inside and the outside of the driving actuator. However, the auto-focus controlling apparatus according to this embodiment has much smaller size of adding the diameter of the lens barrel 500 to the space between the inside and the outside of the yoke 534.

Figure 7:
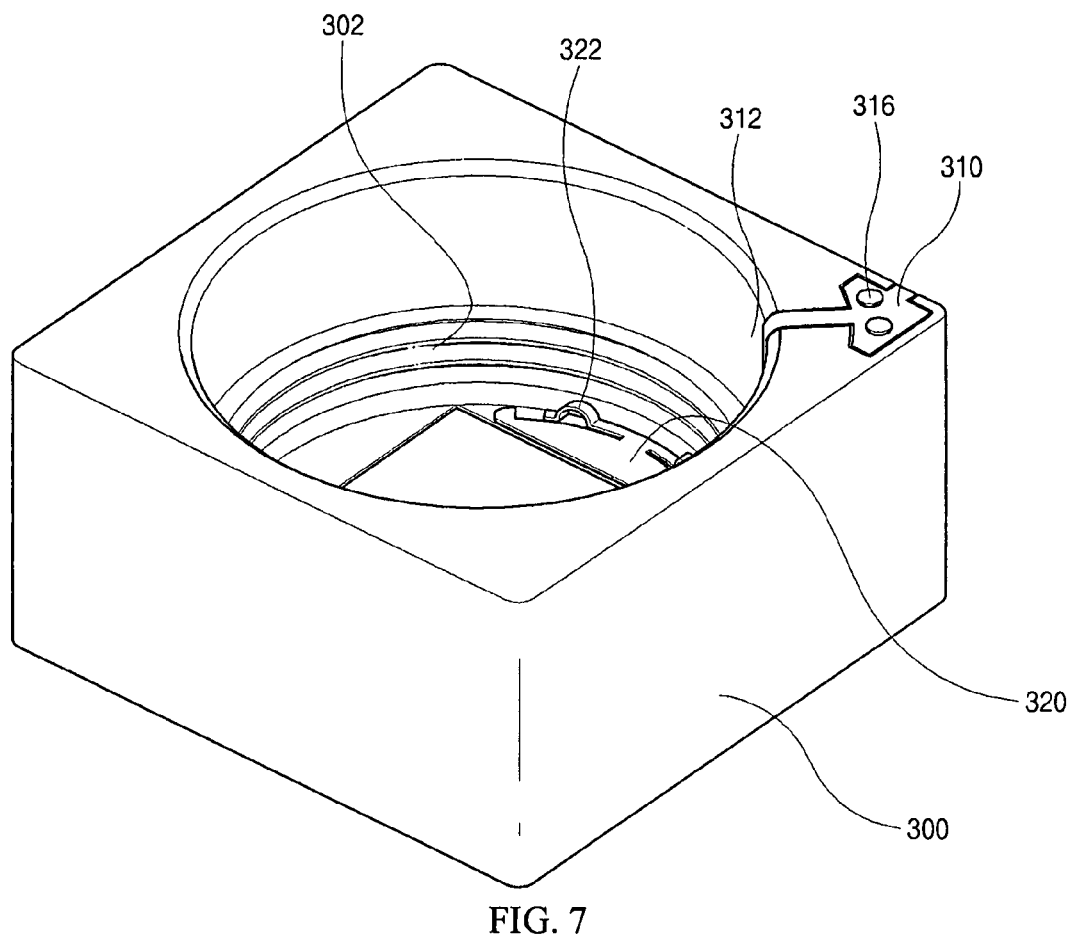
FIG. 7 is an upper perspective view of a hosing constituting an auto-focus controlling apparatus according to the present invention.
Figure 8:
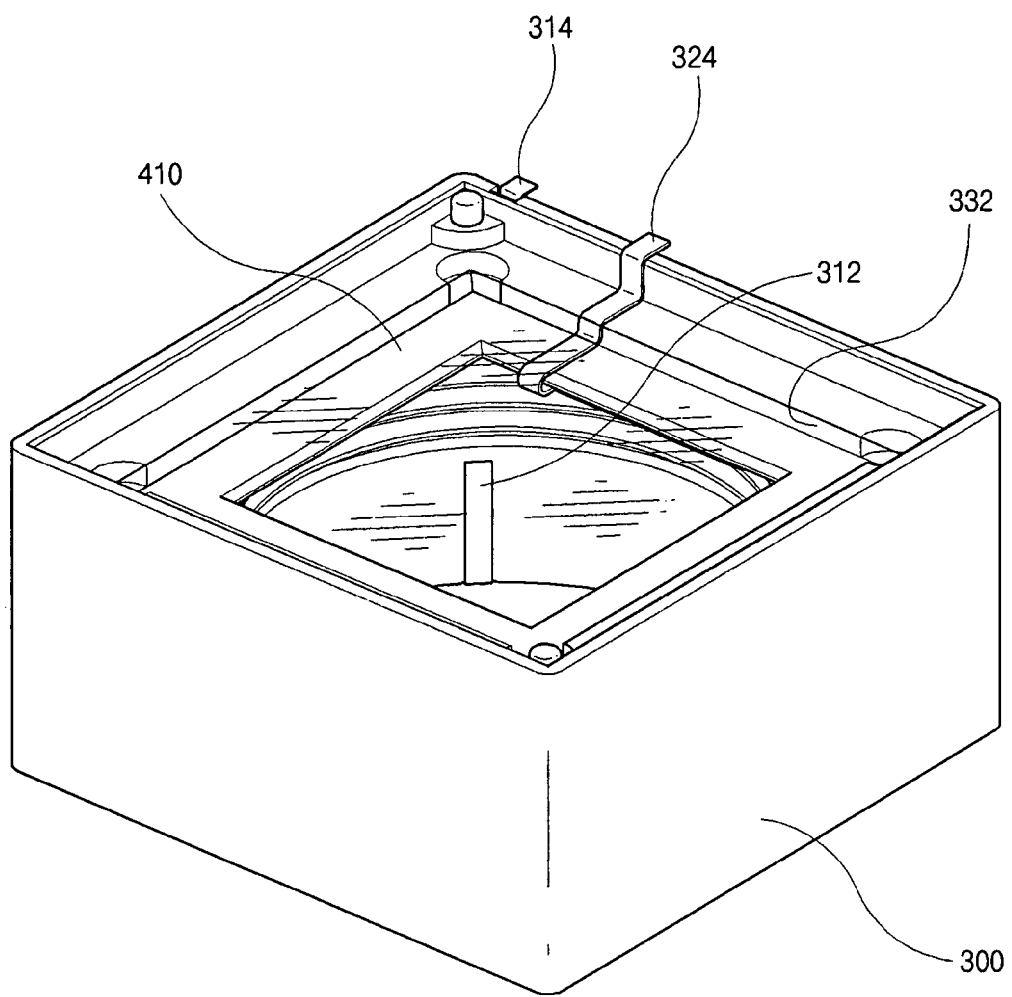
FIG. 8 is a lower perspective view of a housing to which a filter is bound.

As mentioned above, a housing 300 is joined to the outside of the lens assembly for accommodating the lens assembly. FIG. 7 is an upper perspective view of a hosing constituting an auto-focus controlling apparatus according to the present invention, and FIG. 8 is a lower perspective view of a housing to which a filter is bound. As shown the Figures, the housing 300 forms threads 302, which is corresponding to the threads 252 of the lower cover 250 (in FIG. 4) or the threads 552 of the yoke 532 ((in FIG. 6). Therefore, the housing 300 joined to the lens assembly 200 through the threads coupling. Besides, the first brush 310 is formed on the top edgy of the housing 300 for applying specific voltages such as (−) voltages, and the second brush 320 is formed along a part of a lower inside of the housing 300. The first brush 310 is in contact with the first yoke 234 and the second brush is in contact with the second elastic means 262 which is arranged beneath the lens assembly 200, as described below.

The first brush 310 is fixed to the housing 300 with a hollow top center for accommodating the lens assembly 200 thorough a boss 310 which is formed on the top edgy. The first terminal 312 of the first brush 310 is extended from the top edgy of the housing and bent downwardly along the inside of the housing 300 to an interim region of the housing 300. Accordingly, as the lens assembly 200 is joined to the housing by threads coupling, the first terminal 312 of the first brush contact with the outside of the first yoke 234 which constitutes the upper periphery of the lens assembly 200. On the contrary, the second terminal 314 of the first brush 310 is extended downwardly along the outside of the housing 300 and bent outwardly in a lower portion of the housing 300. The second terminal 314 of the first brush 310 is connected electrically to a cathode of a power supply (not shown). The first brush 310, the first terminal 312 and the second terminal 314 may be inserted into grooves or slots each of which is formed on the top periphery, along the inside or the outside of the housing 300, respectively, for fixing stably the first brush 310 to the housing 300. Therefore, for example (−) voltages can be applied sequentially to the first yoke 234 through the second terminal 314—the first brush 310—the first terminal 312, to the first elastic means 260 which is contacted pressurizably with the first yoke 234, and to the driving coil 240 which is in contact with the second driving means 260.

On the other hand, the second brush 320 is fixed along a lower portion of the housing 300 for applying (+) voltages into the driving coil 240. For achieving this object, a first end 322 of the second brush 320 is protruded upwardly like a semicircle so that it can contact with a bottom periphery of the second elastic means 262 which is joined to the lens barrel 210 and the lower cover 250, as shown in FIG. 7. Besides, the other end 324 of the second brush 320 is extended outwardly along a groove which is formed along the bottom of the housing 300 and connected to an anode of the power supply (not shown), as shown in FIG. 8. Accordingly, for example (+) voltage can be applied sequentially to the second elastic means 262 through the second end 344—the second brush 320—the first end 322 and to the driving coil 240 which is connected electrically to the second elastic means 262 through a groove (not shown) formed along the outside of the lens assembly 210.

The second brush 320 may be formed symmetrically along the lower inside periphery of the housing 300 for preventing the lens assembly 210 from being tilted owing to the first end 322. However, it is preferable that only one of the symmetrically formed second brushes 320 connects electrically to the power supply (not shown). Also, (−) voltage is applied into the first brush 310 and (+) voltage is applied into the second brush 320 in the above description as illustrative. On the other hand, (+) voltage can be applied into the first brush 310 and (−) voltage can be applied into the second brush 320. Besides, a filter 410 such as a UV filter may be bonded to a central bottom 332 of the housing 300 by applying appropriate adhesives in the central bottom 332.

Figure 9:
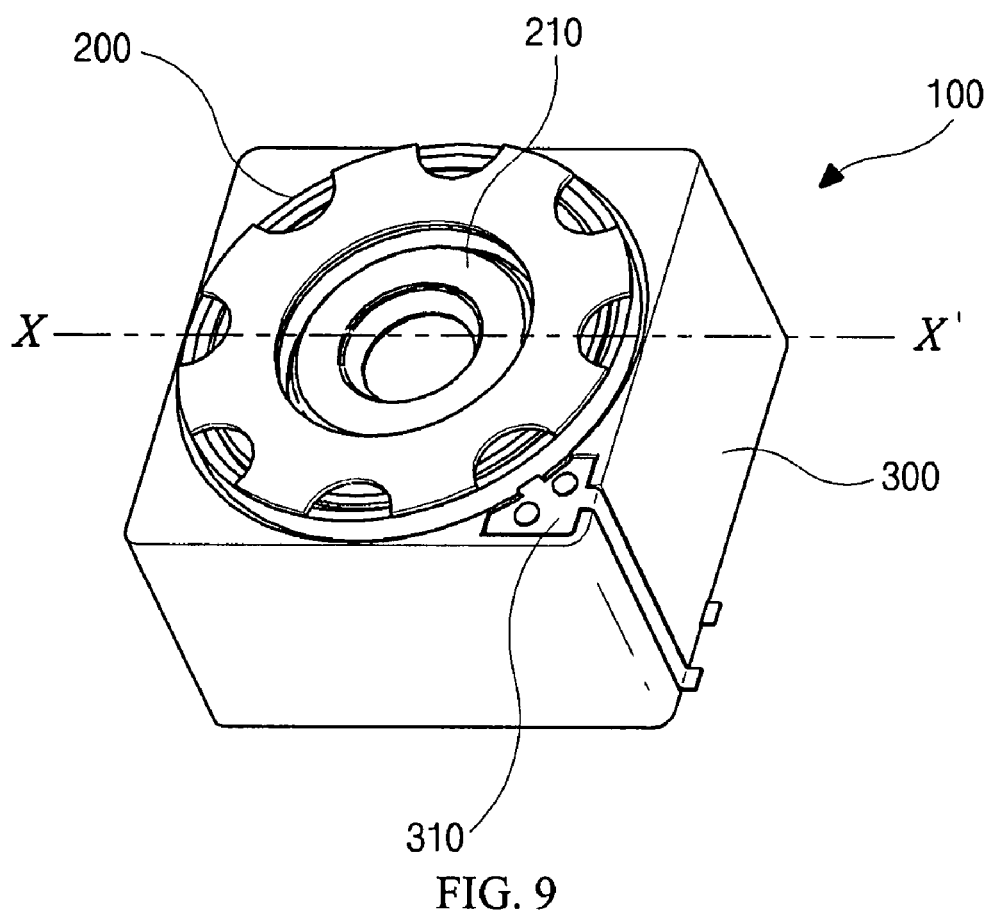
FIG. 9 is a perspective view of an auto-focus controlling apparatus according to the present invention.
Figure 10A:
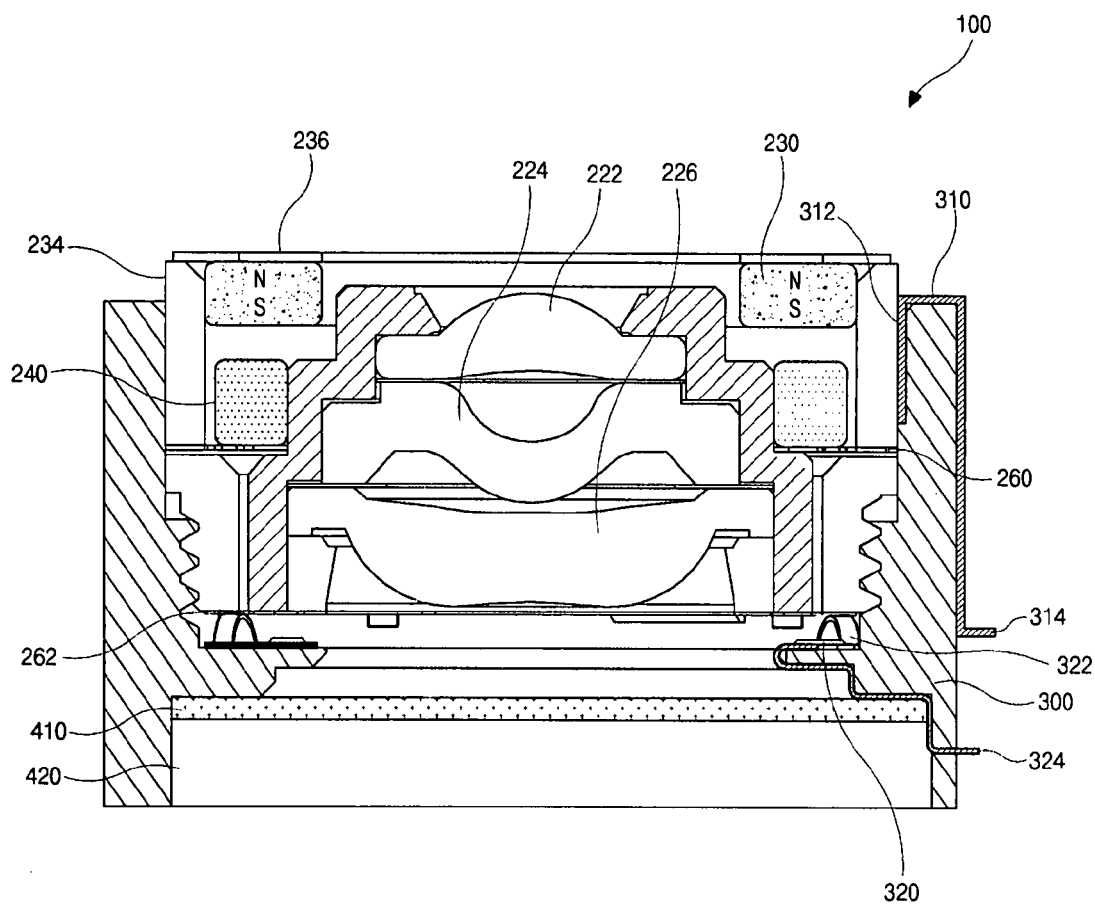
Figure 10B:
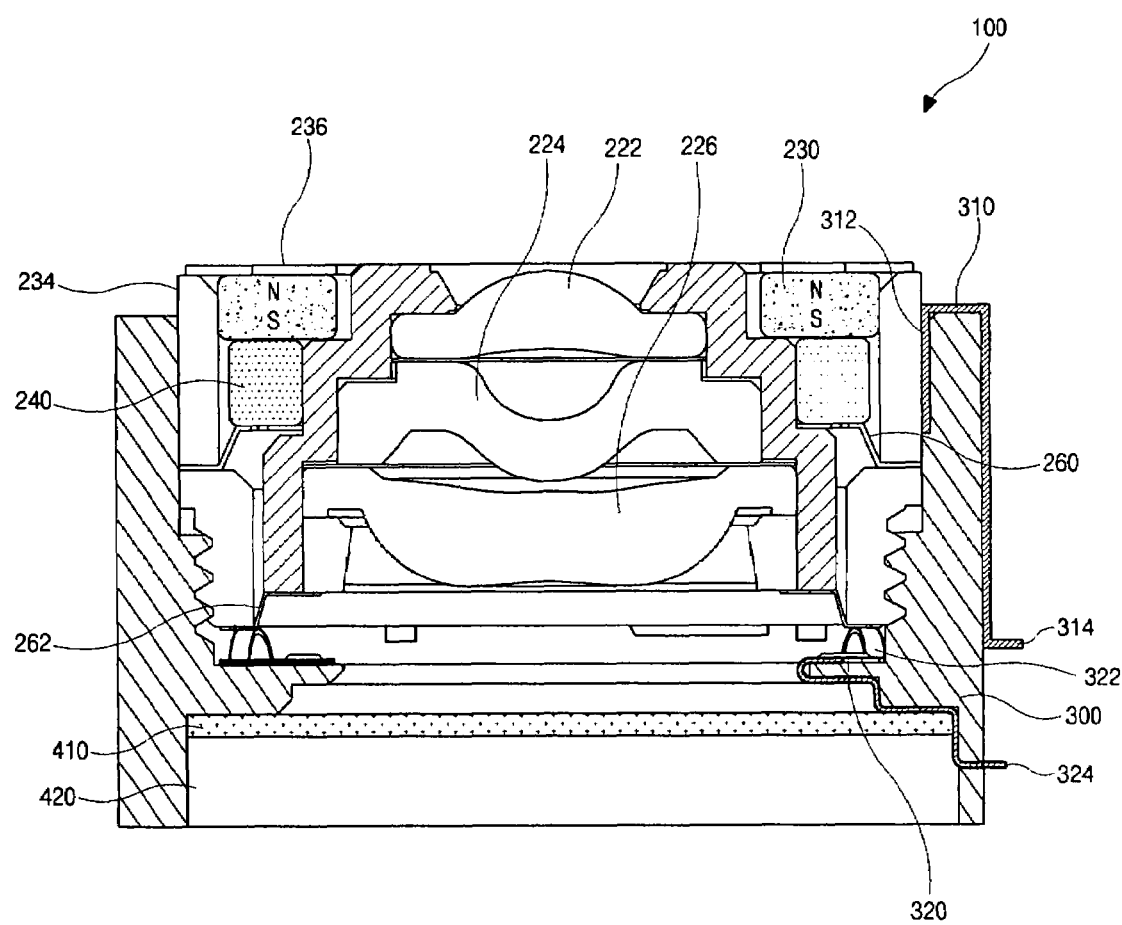

It will be explained in more detail about the auto-focus controlling apparatus 100 which includes the lens assembly 200 having a driving actuator 230 arranged closely along the outside of the lens barrel 210, and a housing accommodates the lens assembly 200. FIG. 9 is a perspective view of an auto-focus controlling apparatus according to the present invention, and FIGS. 10A and 10B are cross-sectional view taken along the line X-X' of FIG. 9, wherein FIG. 10A shows arrangements of components prior to focusing and FIG. 10B shows arrangements of components after focusing.

As mentioned above, the first elastic means 260 is interposed pressurizably between the bottom of the yoke 234 and the top of the lower cover 250, and the second elastic means 262 is joined to the lower portions of the lens barrel 210 and the lower cover 250. Both the elastic means 260 and 262 press the lens barrel 210 into the direction of the optical axis. In addition, the filter 410 and an image sensor (not shown), which are bonded to a lower inside of the housing 300, are formed below the lens assembly 200. The image sensor may by supported by a base (not shown) which is bound to the lower portion of the housing 300. Accordingly, an image of an object is passed through the lens assembly 210 with a hollow center and then transferred to the image sensor via the filter 410. The image sensor (not shown) transforms the image into an electrical signal, which is transferred to a controller in the camera module for focusing. In this operational mechanism, the lens barrel 210 may move up and down along the optical axis.

In other words, when a user of the device such as a mobile communication device which adopts the auto-focus controlling apparatus 100 pushes a shutter, the image sensor (not shown) begins its operation so that the image of the object is passed through the lens assembly 200 and the filter 410. The image of the object is transformed into a predetermined electrical signal in the image sensor and then transferred to the controller of the camera module. If the controller perceives the transferred image signal of the object as being blurred, the controller comes to the conclusion that there is a focusing error in the lens assembly 200. Accordingly, currents for driving the lens barrel 210 into the direction of the optical axis is applied into the driving coil 240 via the brushes 310 and 320 which are fixed to the housing 300. For example, about 60~100 mA of currents may be applied into the driving coil 240 for operating the driving actuator of the present invention which adopts VCM mechanism.

As a predetermined current is applied into the driving coil 240, the electric field generated along the driving coil 240 interacts with the magnetic force generated from the magnet 232 so that Lorentz force is generated. The lens barrel 210 moves up and down along the optical axis by Lorenz force. According to the present invention, the lens barrel 210, the lens unit 220 and the driving coil 240 may be moved up and down by about 0.02~0.05N of a driving force. Such a driving force causes the lens barrel 210 to overcome the elastic forces of the elastic means 260 and 262 and to move up and down. In this case, the controller changes the current directions to move the lens barrel 200 up and down, and thereby accomplishing auto-focusing which makes the image of the object in the image sensor clearly.

In the figures, the magnet 232 is arranged along the upper outside of the lens barrel 210, and the coil 240 is arranged below the magnet 232. However, it is possible to change their positions, that is, to arrange the driving coil 240 along the upper outside of the lens barrel 210 and the magnet 240 below the coil 240. In this case, the magnet 232 will be moved by Lorentz force, not the driving coil 240.

It will be apparent to those skilled in the art that various modifications and variations can be made in the fabrication and application of the present invention without departing from the spirit or scope of the invention. Thus, it is intended that the present invention cover the modifications and variations of this invention provided they come within the scope of the appended claims and their equivalents.

What is claimed is:

1. A lens assembly comprising:
   a lens barrel accommodating one or more lenses for focusing;
   a driving actuator arranged along an outside of the lens barrel for operating the lens assembly, the driving actuator comprising a magnet generating magnetic force and a coil connected to a power supply; and an elastic means formed adjacently to the driving actuator, wherein at least one of the magnet and the coil has an internal diameter smaller than a maximal external diameter of the lens barrel, and the lens barrel has a first portion having a first external diameter, a second portion having a second external diameter being larger than the first external diameter, and a third portion having a third external diameter being larger than the second external diameter, and wherein the magnet is disposed along one of the first and second portions, and the coil is disposed along the other one of the first and second portions.

2. The lens assembly according to claim 1, wherein the lens barrel comprises a plurality of diametric portions, each of which has different external diameters respectively, wherein the magnet or the coil is disposed along any one of the plurality of diametric portions which has not maximal external diameter.

3. The lens assembly according to claim 1, wherein the lens barrel comprises a first diametric portion and a second diametric portion which has an external diameter larger than an external diameter of the first diametric portion.

4. The lens assembly according to claim 3, wherein the magnet or the coil is arranged adjacently to the first diametric portion.

5. The lens assembly according to claim 1, wherein the lens barrel comprises a first diametric portion, a second diametric portion which has an external diameter larger than an external diameter of the first diametric portion, and a third diametric portion which has an external diameter larger than the external diameter of the second diametric portion.

6. The lens assembly according to claim 5, wherein the magnet is arranged along the first diametric portion and the coil is wound around the second diametric portion.

7. The lens assembly according to claim 1, further comprising a yoke for inducing the magnetic force into a predetermined direction.

8. The lens assembly according to claim 7, wherein the yoke comprises a first yoke disposed adjacently to outsides of the magnet and the coil and a second yoke formed over the first yoke and the magnet.

9. The lens assembly according to claim 7, further comprising a lower cover formed adjacently to a lower portion of the outside.

10. The lens assembly according to claim 9, wherein the elastic means comprises a first elastic means inserted between the yoke and the lower cover and a second elastic means joined to the lens barrel and the lower cover.

11. The lens assembly according to claim 1, wherein the elastic means comprises a spring.

12. An auto-focus controlling apparatus comprising:
a lens assembly including:
a lens barrel accommodating one or more lenses for focusing;
a driving actuator arranged along an outside of the lens barrel for operating the lens assembly, the driving actuator comprising a magnet generating magnetic force and a coil connected to a power supply; and
an elastic means formed adjacently to the driving actuator, wherein at least one of the magnet and the coil has an internal diameter smaller than a maximal external diameter of the lens barrel; and
a housing accommodating the lens assembly;
wherein the lens barrel has a first portion having a first external diameter, a second portion having a second external diameter being larger than the first external diameter, and a third portion having a third external diameter being larger than the second external diameter, and wherein the magnet is disposed along one of the first and second portions, and the coil is disposed along the other one of the first and second portions.

13. The apparatus according to claim 12, wherein the lens assembly is connected to the housing through threads.

14. The apparatus according to claim 12, wherein the lens barrel comprises a plurality of diametric portions each of which has different external diameters respectively, wherein the magnet or the coil is disposed along any one of the plurality of diametric portions which has not maximal external diameter.

15. The apparatus according to claim 12, wherein the lens barrel comprises a first diametric portion and a second diametric portion which has an external diameter larger than an external diameter of the first diametric portion.

16. The apparatus according to claim 15, wherein the magnet or the coil is arranged adjacently to the first diametric portion.

17. The apparatus according to claim 12, wherein the lens barrel comprises a first diametric portion, a second diametric portion which has an external diameter larger than an external diameter of the first diametric portion, and a third diametric portion which has an external diameter larger than the external diameter of the second diametric portion.

18. The apparatus according to claim 17, wherein the magnet is arranged adjacently to the first diametric portion and the coil is wound around the second diametric portion.

19. The apparatus according to claim 12, the lens assembly further comprising a yoke for inducing the magnetic force into a predetermined direction.

20. The apparatus according to claim 19, wherein the yoke comprises a first yoke disposed adjacently to outsides of the magnet and the coil and a second yoke formed over the first yoke and the magnet.

21. The apparatus according to claim 19, the lens assembly further comprising a lower cover formed adjacently to a lower portion of the outside.

22. The apparatus according to claim 21, wherein the elastic means comprises a first elastic means inserted between the yoke and the lower cover and a second elastic means joined to the lens barrel and the lower cover.

23. The apparatus according to claim 12, wherein the elastic means comprise a spring.

24. The apparatus according to claim 12, the housing further comprises a brush which is contacted with the lens assembly.

25. The apparatus according to claim 24, wherein the brush comprises a first brush formed on the housing and a second brush formed in a lower portion of the housing.

26. The apparatus according to claim 25, wherein the first brush is connected to the coil through a yoke.

27. The apparatus according to claim 25, wherein the second brush is connected to the coil through the elastic means.

28. The apparatus according to claim 25, wherein the first brush comprises one terminal extended downwardly along the outside of the housing and another terminal extended downwardly along the inside of the housing.

29. The apparatus according to claim 25, wherein the second brush comprises one end protruded upwardly in the housing and another end extended laterally.

30. The apparatus according to claim 12, further comprising a filter bonded to a bottom of the housing.

* * * * *